Sept. 17, 1940.    H. H. HOWETH    2,215,372
REFRIGERATING APPARATUS
Filed June 3, 1938    2 Sheets-Sheet 1

INVENTOR.
HARRY H. HOWETH.
BY Joshua H. Potts
ATTORNEY.

Sept. 17, 1940.   H. H. HOWETH   2,215,372
REFRIGERATING APPARATUS
Filed June 3, 1938   2 Sheets-Sheet 2

INVENTOR.
HARRY H. HOWETH.
BY Joshua H. Potts
ATTORNEY.

Patented Sept. 17, 1940

2,215,372

UNITED STATES PATENT OFFICE 2,215,372

REFRIGERATING APPARATUS

Harry H. Howeth, Rehoboth Beach, Del., assignor to Ellendale Corporation, Rehoboth Beach, Del., a corporation of Delaware Application June 3, 1938, Serial No. 211,526

4 Claims. (Cl. 62—89)

This invention has to do with refrigerating apparatus and is concerned primarily with the provision of apparatus designed for the purpose of preserving such food products as certain fruits, vegetables, fish and meats in edible condition over long periods of time.

It is now well recognized that various food products of the classes above listed may be preserved over long periods of time by first freezing them and then maintaining the frozen condition. When permitted to thaw out, after the lapse of even prolonged intervals, the foods will have maintained their edible condition and be of substantially the same quality as at the time of their original freezing.

Frozen food products of this type are now available to the present day housewife in the food markets, but so far as I am aware up to the present time there has been no apparatus susceptible of being employed in the home that is capable of carrying out the essential steps of the above-noted preserving process, namely, initially freezing the food products and then maintaining the frozen condition.

With the foregoing conditions in mind this invention has in view, as its foremost objective, the provision of refrigerating apparatus which is designed for home installation and for the purpose of preserving food by the frozen processes above outlined.

In carrying out this objective in a practical embodiment the invention has in mind the provision of a refrigerating cabinet which includes, as essential characteristics, a quick freezing chamber and a storage compartment which may be separated therefrom by suitable insulation.

The quick freezing chamber is intended to be maintained at a very low temperature so as to be effective to carry out the initial freezing of the foods. When the foods have attained their frozen state such a low temperature is not required to maintain this condition, and the temperature in the storage compartment will, therefore, be higher than that in the quick freezing chamber, and it is obviously intended that when the foods have been initially frozen in the quick freezing chamber they will then be transferred to the storage compartment.

In providing a refrigerating cabinet which would be thoroughly practical for use in the average home the invention has, as a further objective, the provision of a cabinet which includes at the top, and arranged in side by side relationship, two quick freezing chambers each of which includes a mechanical refrigerating unit. The separate identity of each of the quick freezing chambers is established by a removable panel of appropriate insulated material which divides the same off from the storage compartment disposed therebeneath.

While there is a permanent partition of insulating material between the two quick freezing chambers, the storage compartments therebeneath are in open communication with one another, giving the effect of one large storage compartment that extends beneath both the quick freezing chambers. By removing one of the insulating panels the refrigerating unit thereabove is rendered available for maintaining the storage compartment at a required temperature. At the same time the separate identity of the other quick freezing chamber is maintained by the insulating panel, which remains in place, and this quick freezing chamber is available for the initial freezing of the foods.

An important object of the invention is the provision of a refrigerating cabinet of the character above noted which includes a storage compartment provided with means for holding in position therein a plurality of storage drawers, and which means is effective to provide for a thorough circulation of air throughout the storage compartment.

In line with this objective of providing for a proper circulation of air throughout the storage compartment the invention has in view, as a further objective, the provision of a storage drawer which is characterized as being made from an open mesh material through which air may readily circulate.

Yet another feature along this same general line is the provision of a refrigerating cabinet of the type above noted which includes means for creating a forced draft of air through the storage compartments. Such means may take the form of a slow speed electric fan.

Yet another somewhat more detailed feature of the invention is the provision, in a refrigerating cabinet of the character above noted, of a quick freezing chamber which is provided with means for properly supporting a pan beneath the refrigerating unit when it becomes necessary to defrost the latter.

Various other more detailed objects and advantages of the invention will in part become apparent and in part be hereinafter stated, as the description of the invention proceeds.

The invention, therefore, comprises refrigerating apparatus in the form of a cabinet which includes at the top, and in side by side relationship, two quick freezing chambers each of which is separated from a storage compartment thereunder by a removable insulating panel. The storage compartment is provided with means for positioning a plurality of open mesh storage drawers therewithin in such a manner as to provide for the circulation of air throughout the storage compartment. A small fan may also be provided for causing such air circulation. The invention also includes as important parts other detailed features of construction for rendering practical the use of the said refrigerating cabinet.

For a full and more complete understanding of the invention reference may be had to the following description and accompanying drawings, wherein Figure 1 is a front view of a refrigerating cabinet made in accordance with the precepts of this invention. In this view certain parts are broken away to bring out interior details of construction.

Figure 1:
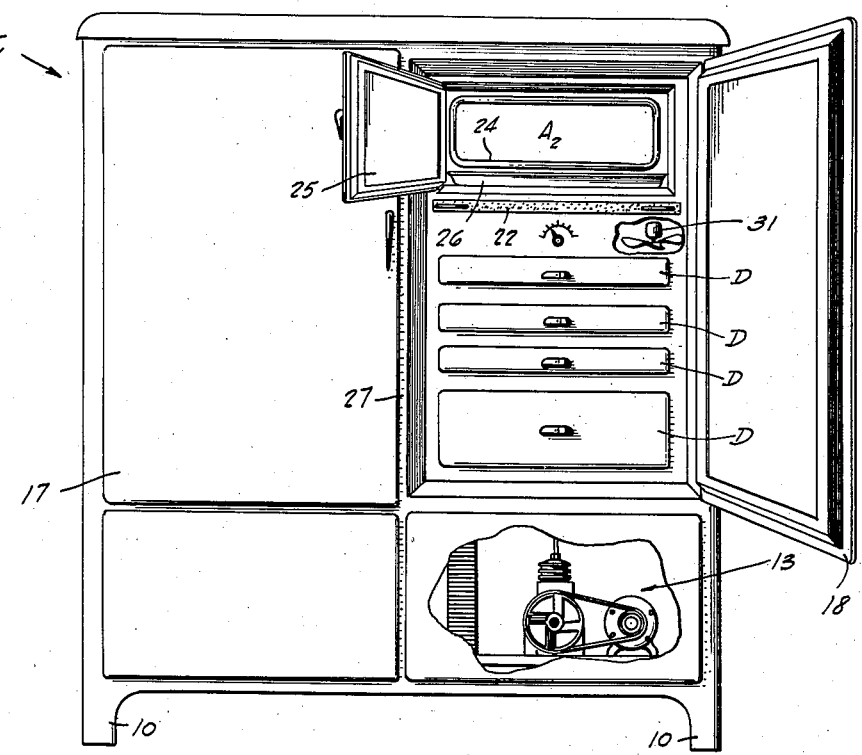

At this point it is well to note that the form of the invention shown in the drawings is for illustrative purposes only, and is not intended to be a limitation as to the form or size which the invention might take in actual practice. The particular size of the cabinet, relative dimensions of the quick freezing chambers and storage compartments, number and size of storage drawers and relationship of the mechanical refrigerating apparatus are all features which might vary with the wishes of any particular manufacturer or user.

Referring now to the drawings, wherein like reference characters denote corresponding parts, the apparatus which is intended to be provided by this invention is shown as taking the form of a cabinet which is referred to in its entirety by the reference character C. This cabinet is shown as being maintained in an upraised relationship from a floor or other supporting surface by supporting legs 10.

Figure 4:
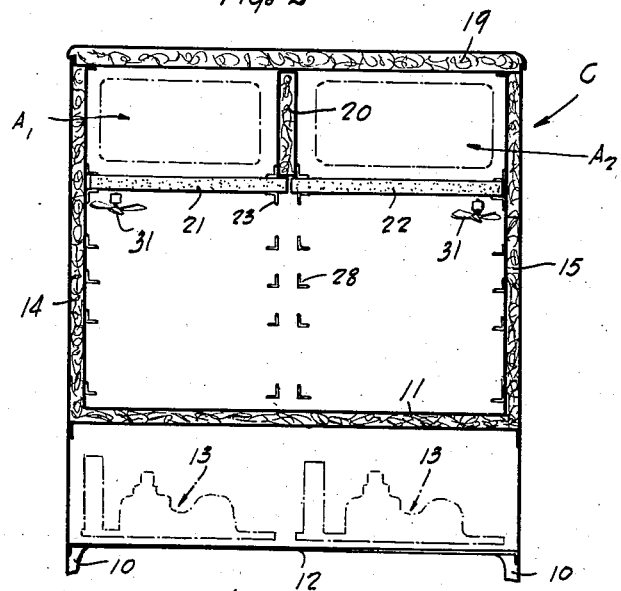
Figure 4 is a section through the cabinet taken at right-angles to the showing of Figure 2.

The cabinet C includes a bottom wall 11 which has required heat insulating properties. Insulating wall structures of this type are now well-known in the refrigerating art and need not be here described in detail. It will be noted that the bottom insulating wall 11 is spaced a considerable distance above a non-insulating wall 12 which supports the refrigerating mechanism, particularly the compressor and electric motor therefor, which are shown generally at 13 in Figures 1, 2 and 4. Inasmuch as the particular type of mechanism employed is not a part of this invention it is not here described in detail. It suffices to say that mechanism of this type is now well-known to those skilled in the refrigerating art.

The cabinet C includes side walls 14 and 15 of an insulated structure comparable to the bottom wall 11 and a rear wall 16 of similar construction. In place of a front wall there are a pair of doors 17 and 18 of insulated structure and hingedly mounted to the side walls 14 and 15 respectively. When in closed position these doors 17 and 18 completely close the front of the cabinet. A top wall 19 also of insulating structure completes the main wall construction of the cabinet.

Extending downwardly from the top wall 19 and substantially intermediate the side walls 14 and 15 is a permanent insulating partition 20, which, it is noted, extends for only a portion of the height of the cabinet. At the bottom edge of the partition 20 there is slidably mounted a pair of removable insulating panels 21 and 22, the latter being supported by the bracket structures represented at 23.

It is evident that when the panels 21 and 22 are in position they cooperate with the partition 20, top wall 19 and the upper portions of the side walls 14 and 15, as well as rear walls 16 and the front doors 17 and 18, to define a pair of chambers designated A1 and A2, and each of which chambers is intended to constitute a quick freezing chamber as occasion demands.

To this end there is disposed in each of the chambers A1 and A2 the usual evaporating coils 24. These evaporating coils 24 are connected by an appropriate conduit (not illustrated) with the compressors in the mechanisms 13, there being an expansion valve provided at a required point, this being a well-known practice in this refrigerating art.

The coils 24 are so arranged that the space enclosed therewithin constitutes the quick freezing chamber proper, as the temperatures within the coils 24 will be lower than any other place within the cabinet, particularly when either of the insulating panels 21 and 22 is positioned thereneath.

Figure 2:
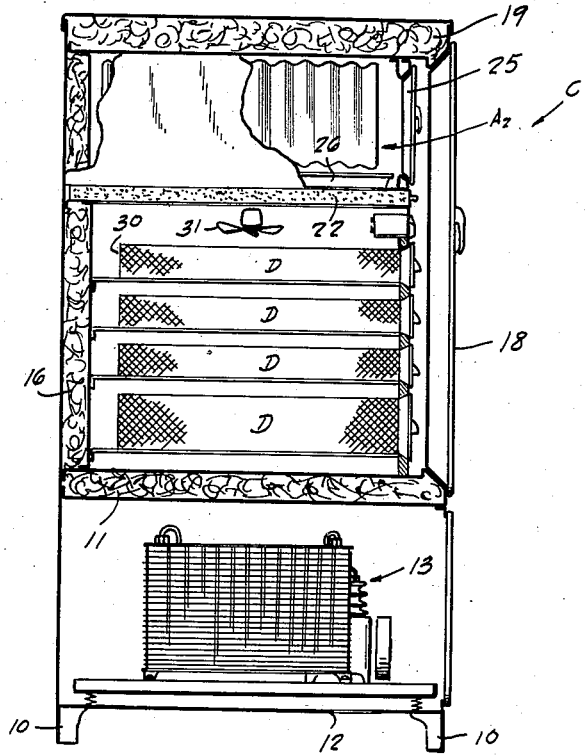
Figure 2 is a side view taken as a section of the cabinet shown in Figure 1.

As clearly brought out in Figures 1 and 2, an auxiliary door for each of the quick freezing chambers A1 and A2 may be provided, as shown at 25. This auxiliary door will also be of insulating structure, and is hingedly mounted in the usual way.

When occasion arises for defrosting either of the coils 24 in the chambers A1 and A2 a pan of tray-like form, such as shown at 26, may be supported directly beneath the coils, for the usual purpose of catching moisture caused by the defrosting.

The cabinet C includes at the front, substantially at the line of joinder between the doors 17 and 18, a partition strut 27 which not only serves to afford a proper sealing of the doors individually, but which provides structure for supporting, at the front of the cabinet, L brackets 28 which extend from the rear wall 16 to this partition strut 27, and which cooperate with similar brackets on the side walls 14 and 15 to provide for the sliding support of storage drawers designated D.

Figure 3:
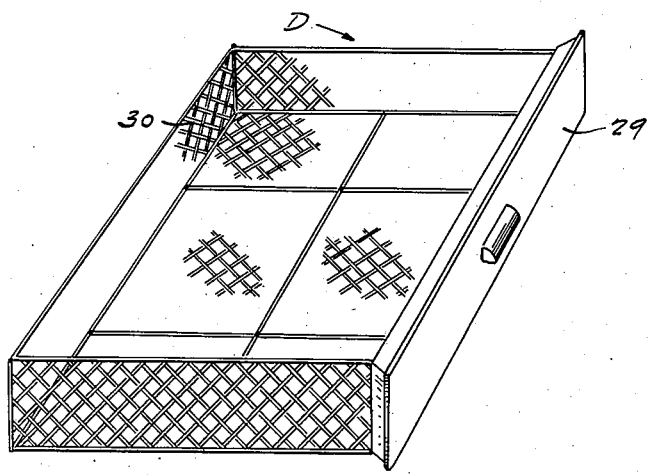
Figure 3 is an enlarged detailed view in perspective of one of the storage drawers.

The storage drawers D may vary in size and number with any particular installation, and while they may be made from any appropriate material, the invention has particularly in mind the use of an open mesh material such as shown in Figure 3, which will accommodate the circulation of air throughout the storage compartment defined by the wall structure of the cabinet.

While the bottom, read and side walls of the drawers D are of an open mesh material, the front walls will preferably be solid, as shown at 29, so as to provide for as little change in temperature as possible in the space behind the front of the drawers when either of the doors 17 and 18 is open.

Upon reference to Figure 2 it will be noted that the rear walls 30 of the drawers D are spaced from the rear wall 16 of the cabinet, and in a similar manner the front walls 29 are spaced from the doors 17 and 18 when the latter are in closed position. This arrangement, together with the open mesh and the absence of any partition beneath the permanent partition 20, insures of the required circulation of air throughout the storage compartment.

One or more electric fans, shown at 31, may be included at appropriate points within the cabinet, for the purpose of creating forced circulation if occasion demands.

The normal mode of use of the refrigerating apparatus above described may be briefly described as follows:

With several of the drawers D containing foods that have attained a frozen condition by being first subject to the actions of one of the freezing compartments $A_1$ and $A_2$, one of the removable insulating panels 21 and 22, say for instance the panel 21, is removed, thus rendering the coil 24 for the chamber $A_1$ effective to maintain the storage compartment receiving the several drawers D at a required temperature. At the same time the presence of the insulating panel 22 permits of the coil 24 in the chamber $A_2$ maintaining this quick freezing chamber at a lower temperature than that within the storage compartment so that food products may be inserted within the coil 24 for their initial freezing.

After they have attained their frozen state they are removed to one of the storage drawers D. Obviously the mechanism 13 for the coil 24 in the chamber $A_2$ will be operated only when this quick freezing is required, as under ordinary conditions the operation of one of the units will be sufficient to maintain the compartment at the required storage temperature.

While preferred specific embodiments of the invention are hereinbefore set forth it is to be clearly understood that I am not to be limited to the exact constructions illustrated and described, because various modifications of these details may be provided in putting the invention into practice within the purview of the appended claims.

I claim:

1. A refrigerating cabinet of the character described comprising insulating wall structures defining at the top of the cabinet a pair of quick freezing chambers in side by side relationship, the said wall structures including a removable insulating panel for each of the quick freezing chambers, said cabinet defining a storage compartment beneath said quick freezing chambers, and mechanical refrigerating units associated with said cabinet and providing a coil located in each of said quick freezing chambers.

2. A refrigerating cabinet of the character described comprising insulating wall structures defining at the top of the cabinet a pair of quick freezing chambers in side by side relationship, the said wall structures including a pair of removable insulating panels which together with the remainder of the insulating wall structure of the cabinet define a storage compartment extending beneath both the said quick freezing chambers, a refrigerating coil in each of the quick freezing chambers, refrigerating mechanism associated with the said coils, brackets carried by the wall structure of the cabinet constituting means for slidably supporting a plurality of storage drawers within the storage compartment, and storage drawers slidably carried by said brackets.

3. A refrigerating cabinet of the character described comprising insulating wall structures defining at the top of the cabinet a pair of quick freezing chambers in side by side relationship, the said wall structures including a pair of removable insulating panels which together with the remainder of the insulating wall structure of the cabinet define a storage compartment extending beneath both the said quick freezing chambers, a refrigerating coil in each of the quick freezing chambers, refrigerating mechanism associated with the said coils, brackets carried by the wall structure of the cabinet constituting means for slidably supporting a plurality of storage drawers within the storage compartment, and storage drawers slidably carried by said brackets, each of said storage drawers having a bottom of an open mesh material and its rear wall spaced from the corresponding wall of the cabinet to provide for the circulation of air throughout the cabinet.

4. A refrigerating cabinet of the character described comprising insulating wall structures defining at the top of the cabinet a pair of quick freezing chambers in side by side relationship, the said wall structures including a pair of removable insulating panels which together with the remainder of the insulating wall structure of the cabinet define a storage compartment extending beneath both the said quick freezing chambers, a refrigerating coil in each of the quick freezing chambers, refrigerating mechanism associated with the said coils, brackets carried by the wall structure of the cabinet constituting means for slidably supporting a plurality of storage drawers within the storage compartment, storage drawers slidably carried by said brackets, each of said storage drawers having a bottom of an open mesh material and its rear wall spaced from the corresponding wall of the cabinet to provide for the circulation of air throughout the cabinet, and means for inducing a forced circulation of air throughout the cabinet.

HARRY H. HOWETH.